UNITED STATES PATENT OFFICE.

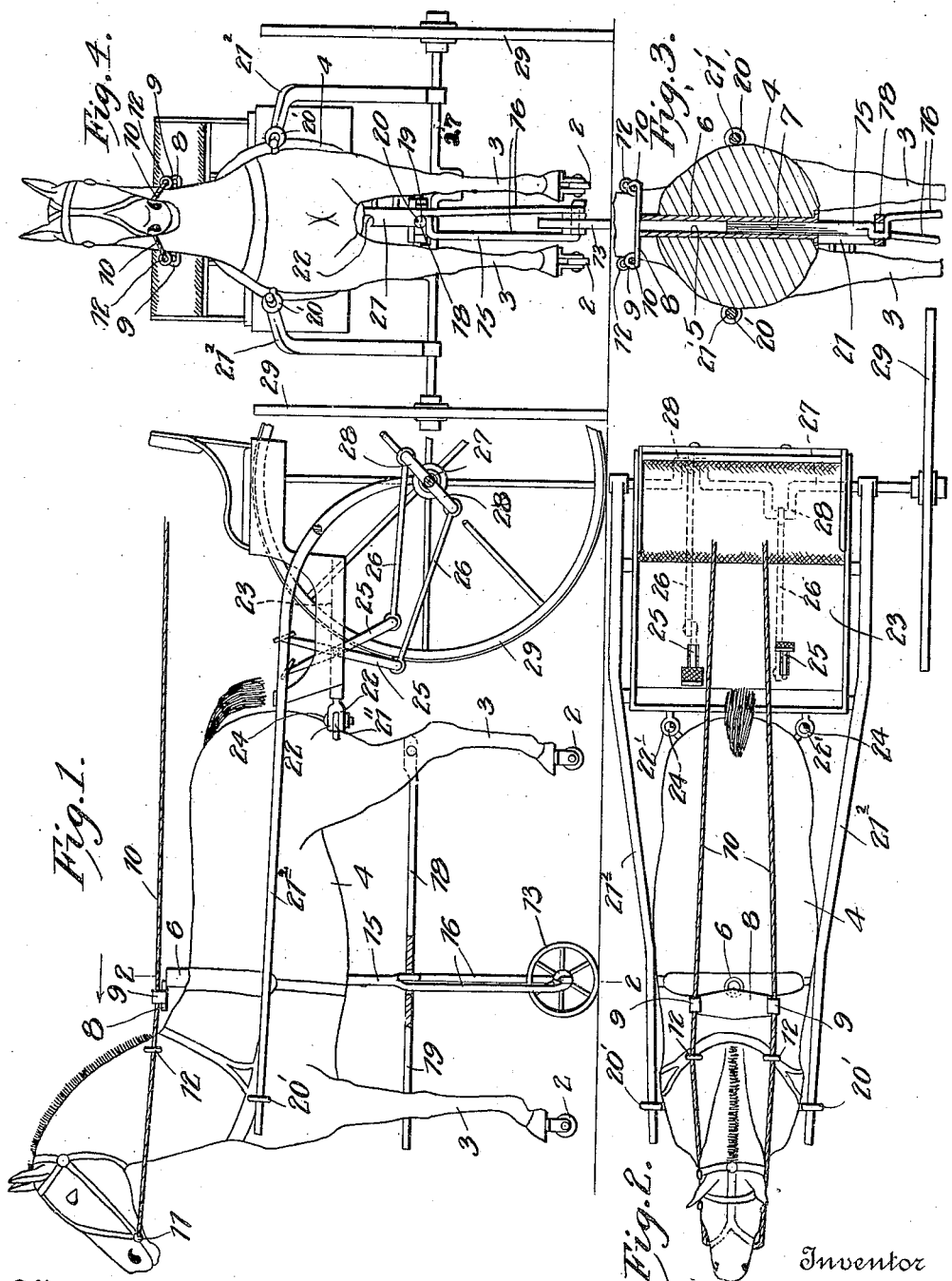

JOHN B. SPENCER, OF SPOKANE, WASHINGTON.

WHEELED TOY.

No. 922,639.   Specification of Letters Patent.   Patented May 25, 1909.

Application filed August 6, 1908. Serial No. 447,259.

*To all whom it may concern:*

Be it known that I, JOHN B. SPENCER, a citizen of the United States, residing at Spokane, in the county of Spokane and State of Washington, have invented certain new and useful Improvements in Wheeled Toys; and I do declare the following to be a full, clear, and exact description of the invention, such as will enable others skilled in the art to which it appertains to make and use the same.

This invention relates to improvements in wheeled toys and consists of the figure of a horse mounted upon wheels with means for attaching or hitching the horse to a cart or wagon of any description and for guiding the horse by the reins from the seat of the cart or wagon.

With these and other objects in view, the invention consists of certain novel features of construction, combination and arrangement of parts, as will be more fully described and particularly pointed out in the appended claims.

In the accompanying drawings, Figure 1 is a side elevation of a wheeled toy embodying my improvements; Fig. 2 is a top plan view; Fig. 3 is a transverse section taken on line 2—2 of Fig. 1; and, Fig. 4 is a front view.

In the embodiment illustrated the toy comprises the figure of a horse mounted upon wheels 2, which are journaled to the legs 3, of the horse.

In carrying the invention into effect, the body 4 of the wheeled toy is provided with a central vertical opening 5, in which is revolubly mounted a tube 6, provided with a square socket 7, the purpose of which will be shown, and at its upper end with a transverse back piece 8, bent inwardly at opposite ends, as at 9, against portions of a flexible element 10 which extends through a corresponding guide opening 11, formed in the head portion of the horse and through guides 12 arranged at the neck portion. A supporting wheel 13 is mounted at the lower end of a support 15 provided at said end with laterally spaced legs 16. The central portion of the support 15 is of approximately square form to fit in the square socket of the tube 6, so that when the latter is turned in its opening by means of the reins the support and supporting wheel 13, is also caused to turn and guide the wheeled figure.

When the figure is hitched to the cart or wagon the supporting wheel 13 is supported to run upon the ground with the wheels 2 in elevated position by means of a pivoted support 18, pivoted between the hind legs of the figure and provided with a reduced front portion 19, adapted to be engaged with the lower recessed portion 20, of an upright catch 21 mounted between the front legs of the figure, the reduced portion of the pivoted support being also adapted to be engaged with the upper recessed portion 22, of the catch when it is desired to support the supporting wheel 18, in elevated position in order to allow the wheeled figure to run upon the wheels 2, as in unhitching said figure. The body of the figure is also provided at opposite sides with laterally projecting eyes 20', to receive the shafts 21 of the cart or wagon to which the wheeled figure is attached, the rear end of the body 4, of the figure having rearwardly projecting eyes $21^2$ which fit between vertically spaced pairs of eyes 22', extending forwardly from the platform 23, of the cart, the figure being hitched to the cart by keeper pins 24, which are inserted through the eyes of the figure and those of the platform. The cart is preferably propelled by upright operating levers 25 pivoted to the platform and extending below the same, the lower ends of said levers being connected with pitmen 26, which connect with the cranks 28 of a double crank axle 27, to which the supporting wheels 29 are fixed.

It is to be understood that the wheeled figure may be attached to a wagon or other different forms of vehicles.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim as new is:—

1. In a toy of the class described, a wheeled figure, a vertically adjustable guide wheel, and means for connecting the guide wheel with the wheeled figure whereby either one of said elements may be supported in elevated position upon the other.

2. In a toy of the class described, a wheeled figure, a vertically adjustable wheel support rotatably mounted in and extending beneath the body of the figure, a longitudinally disposed support pivoted to swing in a vertical plane beneath the body of the figure, the support having an opening to receive the wheel support, and a catch provided with upper and lower recessed portions to receive the front end of the pivoted support.

3. In a toy of the class described, a wheeled figure, pairs of forwardly projecting eyes extending from the vehicle, rearwardly projecting eyes extending from the figure between the first mentioned pairs of eyes, and keeper pins for connecting the eyes of the figure with those of the vehicle.

In testimony whereof I have hereunto set my hand in presence of two subscribing witnesses.

JOHN B. SPENCER.

Witnesses:
 LOUIS HUNT,
 CHARLOTTE L. HUNT.